United States Patent [19]
McLean

[11] 3,745,333
[45] July 10, 1973

[54] HOT BOX LOCATERS WITH CIRCULATING FLUID SYSTEM

[76] Inventor: Banjamin F. McLean, 2303 Caplhart Road, Richmond, Va. 23229

[22] Filed: Mar. 9, 1971

[21] Appl. No.: 122,364

[52] U.S. Cl. ............................ 246/169 D, 239/125
[51] Int. Cl. ............................ B61l 3/06, B61k 9/06
[58] Field of Search .......................... 251/129, 141; 239/585, 117, 125; 246/169 D

[56] References Cited
UNITED STATES PATENTS

| | | | |
|---|---|---|---|
| 3,212,715 | 10/1965 | Cocks | 239/125 |
| 3,662,168 | 5/1972 | Pelino et al. | 246/169 D |
| 3,472,458 | 10/1969 | Biggle | 239/585 |
| 3,235,185 | 2/1966 | Enssle | 239/585 X |
| 3,331,042 | 7/1967 | Erickson et al. | 251/129 X |

Primary Examiner—Gerald M. Forlenza
Assistant Examiner—George H. Libman
Attorney—Laurence R. Brown

[57] ABSTRACT

There is disclosed a hot box locator for identifying and locating overheated journal bearings, which circulates a special marking fluid for spraying on train wheels when a defect is detected. The defective overheated journal bearings are detected by an infrared sensing device. Control means are used to activate specially designed electromagnetic pin valves which spray the vehicle wheels with a temporary marking substance when a hot box is indicated. The pin valve construction and circulating marking fluid causes the equipment to operate even after long periods of inactivity. The present invention is directed to hot box locator systems which detect and mark overheated journale bearings of railroad vehicles.

2 Claims, 4 Drawing Figures

Patented July 10, 1973 3,745,333

INVENTOR
BENJAMIN F. McLEAN

BY Lawrence R. Brown
ATTORNEY

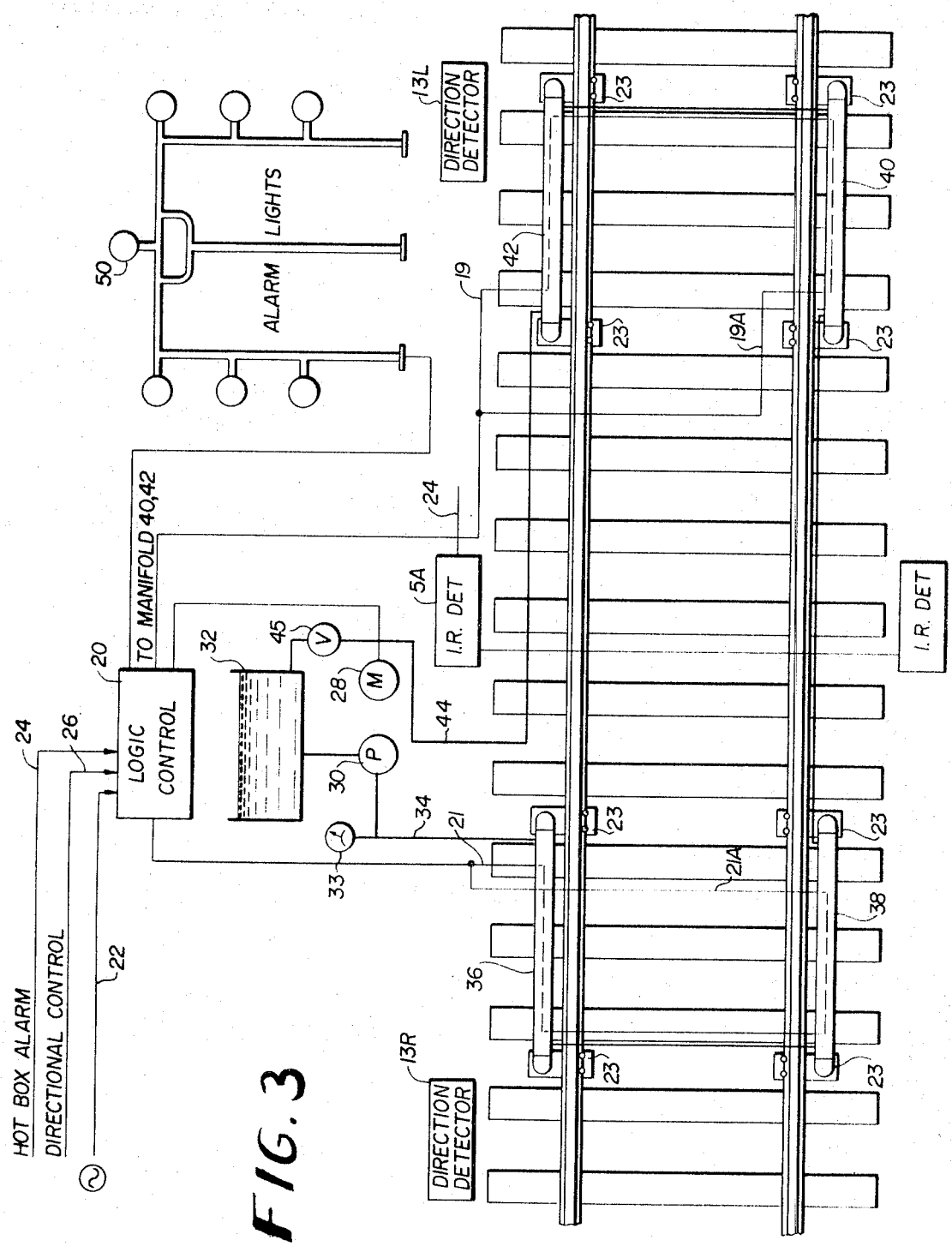

HOT BOX LOCATERS WITH CIRCULATING FLUID SYSTEM

The most common type of hot box locator is a print out type of recorder that indicates the temperature of each journal and is monitored by an operator. For example, if a hot box alarm occurs the operator will count the recorded pulses from the recorder chart, said recorded pulses having been transmitted over a radio carrier line to a central read out location. The operator will then contact the train crew by radio or telephone and tell them where the hot box is located in the train. Here there is a chance the operator will make a mistake in counting the pulses, the train crew may misunderstand the operator when contacted, or the train crew can make a mistake in counting the journals, thus resulting in a possible train derailment due to an undetected overheated journal bearing.

The present invention overcomes the above-mentioned possible safety hazards by specifically marking or painting the exact wheel at the location of the defective journal bearings, thereby allowing positive indentification without intrepretation of charts by an operator. Also, the present invention does not require radio equipment links from the hot box detector location to a central read out location or operator interpretation, thus reducing intital cost and greatly increasing reliability.

Another object of the present invention is to provide a specially designed electromagnetic pin valve which ultimately dispenses the marking fluid that will mark and thereby identify the defective train wheel.

Another object of the present invention is to provide an alarm indicator unit connected to and controlled by a logic control unit.

These and other advantages are clearly set out and defined in the accompanying drawings and the detailed explanation which follows. In the Drawings:

FIG. 3 is a combined block and schematic diagram showing the interrelationships between the logic control means, the circulation system, and the visual indicator.

Figure 1:
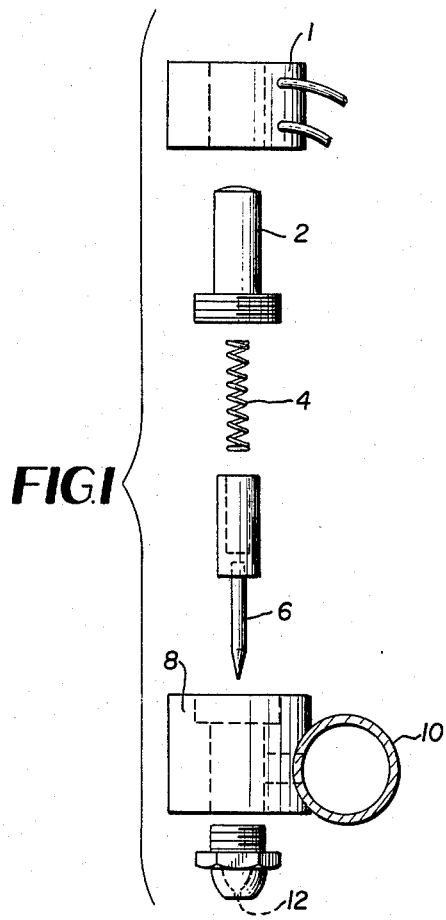
FIG. 1 is an exploded view of an electromagnetic pin valve which enables the present invention to operate at high train speeds.

FIG. 1 is directed to electromagnetic pin valves which enable the present invention to operate with trains travelling at high speeds. More specifically, said valves are operated by the application by logic control means of electric current to a solenoid coil which will pull plunger 6 against spring 4 into housing member 2 thereby opening orifice 12 that is mounted in valve body 8 to receive circulating fluids from manifold pipe 10.

Figure 2:
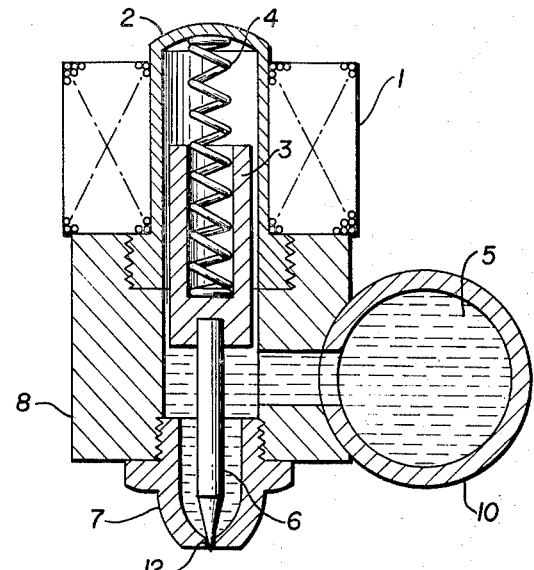
FIG. 2 is an exploded view in cross section of the plunger seated in the orifice of the electromagnetic pin valve.

As may be seen in FIG. 2, the coil surrounds non-magnetic shell housing member 2, to produce a magnetic field in magnetic core member 3 which will pull plunger pin 6 out of orifice 12 against the force of spring 4.

The liquid or semi-liquid grease paint 5 within manifold 10 is under pressure and is circulating to remove any residues and to prevent clogging.

Plunger 6 has a conical end fitting into seated registration with the mating aperture 12 in valve orifice screw in plug 7. In this way the valve closes to force out all residue from the vicinity of the aperture 12 which would otherwise tend to harden and plug the valve or prevent proper closing and sealing of the circulating liquid when the valve is not opened.

In operation several pin valves mounted on each manifold pipe 10 supply the marking fluid that will mark and thereby identify the defective train wheel. This special marking fluid can be a water-soluble grease paint that will remain on the sprayed wheels for a sufficient length of time for the hot box to be observed and remedied. The paint is thrown off the wheel eventually so that after the hot box has been corrected, no confusion will arise as to where the hot box has occured by mistaken identification with previously painted wheels.

As shown in FIG. 2, the pin valves have the capability of being self cleaning in that the plunger 12 will push out paint that might otherwise tend to accumulate in the orifice after the completion of the spraying operation.

FIG. 3 shows the interrelationships between the logic control means, the visual alarm indicator, and marking fluid circulation system. The logic control means is furnished by railroad customer 110 volt service at lead 22. Instructions are received from a hot box alarm detector of a conventional nature at lead 24 and at lead 26 from directional control means later discussed in FIG. 4. When a train enters a zone within a predetermined distance from the location detector of 5, the logical control system 20 is triggered to start the pump driving motor 28 which drives the helical pump 30. The motor driven helical pump assembly 29, 30 circulates the special marking fluid 29 from the reservoir 32 out pipe 34 to track side and throgh manifold pipe means 36, 38, 40 and 42. An automatic pressure regulating valve 45 is mounted on return pipe 44 near where the marking fluid returns to the reservoir in order to set the operating pressure at approximately 50 lb. per sq. in. to assure proper circulation as may be shown on pressure gage 33.

This circulatory system may be actuated every time a train passes the location of detector 5 by a conventional train detector switch. When the train leaves the detector site the circulatory system may be turned off; optionally, depending upon traffic conditions, the circulation may be continuous.

When a train is passing a directional detector site 13L going towards the left as shown in FIG. 3, the logic control circuit 20 is notified at lead 26. If a hot box is detected at detector 5, a signal is produced at lead 24. Then the operation of the pin valves in the left side of either manifold 36 or 38 are preprogrammed by means of manifold leads 21 and 21A passing from logic control 20, depending upon which train side detector 5A or 5B detects the overheated bearing. This operates to spray the marker fluid for approximately 1 second on the wheels at the hot box location.

If the train is travelling in the right direction, as shown in FIG. 2, the logic control unit 20 will select the pin valves at one of manifolds 40 or 42 and mark by way of conductor 19 or 19A the wheel adjacent the hot box therewith if a hot box occurs.

Figure 4:
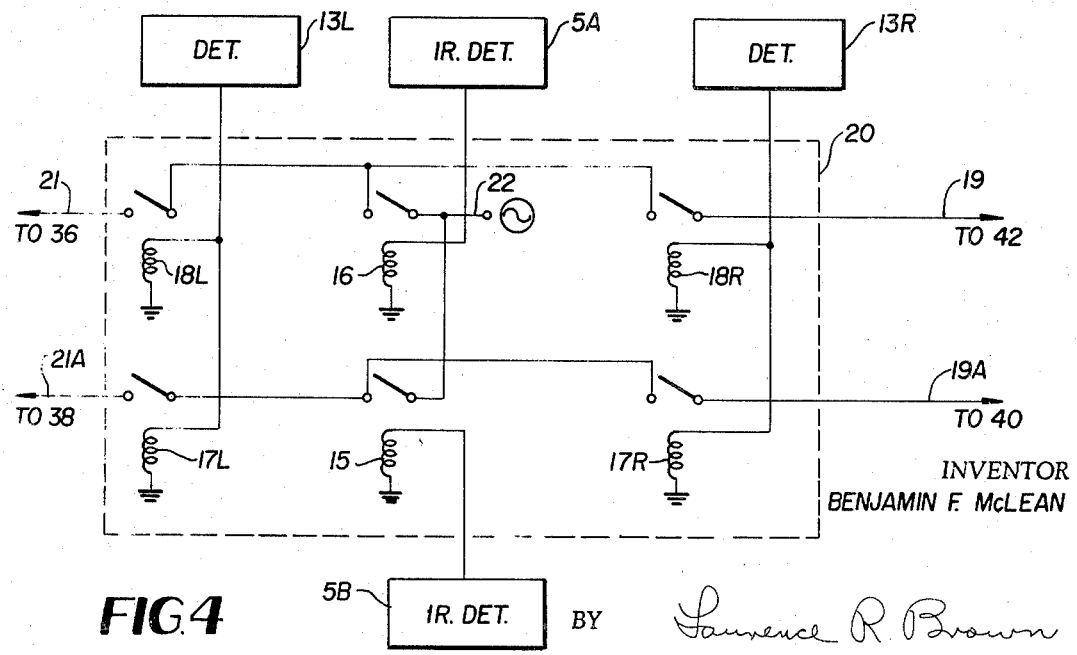
FIG. 4 is a schematic diagram of logic control means used in determining the train direction.

As shown in FIG. 4, the control logic for operating the separate pin valve sets in manifolds 36, 38, 40 and 42 is quite simple. Relays 15, 16, 17 and 18 may be used for example, as operated by the detectors 13L, 13R and 5A, 5B. Thus if a hot box is detected on one side of the train by detector 5A, relay 16 operates to energize lines to manifolds 36 and 42 accordingly. Conversely, detector 5B through relay 16 operates to energize lines to manifolds 38 and 40.

When the train is going towards the left detector 13L operates to select only the leftmost manifold lines 36 or 38, through relays 18L and 17L while conversely detector 13R serves to operate relays 17R and 18R to select leads to manifolds 40 and 42.

The manifold assemblies 36, 38, 40 and 42 are rail mounted with mounting plates 23 for easier installation and incorporating a deflector type shield made of angle iron to protect the pin valves which are shown structurally in FIG. 1.

The manifold assemblies are so spaced from the target area 5 so as to accommodate trains at speeds from 10 to 100 miles per hour.

A typical alarm indicator unit 50 may be locally installed and observed by the rear end or caboose train crew. When the train passes the detectors and there has been a hot box, light 50 will light and also 1-L (left) will light or 1-R (right), thereby informing the train crew that the hot box is on the left side or right side of the train. If lights 50, 1-R, 2-L and 3-L are lit, it will similarly inform the crew that there are three hot boxes and approximately where in the train they are located.

The indicator lights are controlled by the logic control means 20 using information received from the train sensor relayed to the hot box which leads into the logic control unit. The logical control means may comprise a unit made up of transistors and relays mounted on plug connector boards.

When a visual alarm has been indicated the rear end train crew will stop the train, then knowing what side to look on, will look for the painted wheel, or they can stand still for a roll by inspection. The visual indicators may be caused to stay lit for a predetermined time, approximately 1 to 3 minutes, and then go out; at this time the logical control unit will reset for the next train to pass for hot box inspection. Thus, the present invention is always in constant readiness for use.

What is claimed is:

1. In a railway hot box identification system which sprays a marking fluid on a passing train along a set of tracks to identify hot boxes, the combination comprising, means for detecting hot boxes to trigger spraying of said liquid, a plurality of self cleaning valves positioned for spraying said marking fluid on wheels of a passing train and thereby identifying hot boxes, a circulating system for said marking fluid including a plurality of railside mounted manifolds in each of which a plurality of said valves is mounted, said manifolds being mounted on both sides of the tracks and connected in series to provide a fluid path successively through the manifolds, means readying said marking fluid for spraying including pumping means circulating the fluid through said series of manifolds and means in the circulating system keeping the circulating fluid at a predetermined pressure, electric means for responding to a fault signal to operate the valve, valve body means extending from the valves in each said manifold to receive said circulating fluid under pressure and structure whereby the electric means is operated for a short period of time while said fluid is circulating to open said valves in selected manifolds on one side of said tracks thereby dispensing the marking fluid onto a train wheel in response to detection of a hot box.

2. An automatic marking fluid circulatory system for identifying train wheels in order to locate hot boxes which allows a marking fluid to circulate whenever a train enters a zone along the tracks within a predetermined distance from the detector rail mounted location, comprising detector sensing means which are rail mounted for providing a signal when a hot box passes, logic control means furnished with instructions from said detector sensing means and including activating means responsive to the presence of a train, circulatory means operable to maintain said fluid at a predetermined pressure and carrying marking fluid in series through a plurality of railside manifolds on opposite sides of the tracks and providing circulation in the circulatory system through said manifolds when triggered by said logic control means, electromagnetic self cleaning valve means which receive instructions from and are thereby actuated by said logic control means to spray paint on said wheels at said pressure from said circulatory means when said detector identifies a hot box, said manifolds in said circulatory system being rail mounted with a plurality of said electromagnetic valve means mounted on each said manifold to discharge said marking fluid thereby marking the train wheels to identify the hot box.

* * * * *